United States Patent [19]

Haas et al.

[11] 4,325,925

[45] Apr. 20, 1982

[54] METHOD FOR THE REMOVAL OF NITRIC OXIDE FROM GAS STREAMS

[75] Inventors: Frank C. Haas, Arvada; Gerald B. Faudel, Denver, both of Colo.

[73] Assignee: Tosco Corporation, Los Angeles, Calif.

[21] Appl. No.: 156,911

[22] Filed: Jun. 6, 1980

[51] Int. Cl.$^3$ .............................................. B01D 53/34
[52] U.S. Cl. ..................................... 423/239; 423/212
[58] Field of Search ...................... 423/213.5, 239, 351

[56] References Cited

U.S. PATENT DOCUMENTS 3,206,414 9/1965 Gunther ............................ 423/213.5
3,370,914 2/1968 Gross et al. ...................... 423/213.5
3,565,574 2/1971 Rearby et al. ................... 423/239 X

FOREIGN PATENT DOCUMENTS 49-99984 9/1974 Japan ................................. 423/213.5
1354677 5/1974 United Kingdom ............. 423/213.5

OTHER PUBLICATIONS

Klimisch et al; *The Catalytic Chem. of Nitrogen Oxides;* Plenum Press; N.Y.; 1975, pp. 119-127 & 252-259.

*Primary Examiner*—G. O. Peters
*Attorney, Agent, or Firm*—Poms, Smith, Lande & Rose

[57] ABSTRACT

A method for removing nitric oxide from gas streams containing same. The nitric acid is removed by contacting the nitric oxide with elemental iron in the presence of water. The nitric oxide is believed to be reduced to nitrogen gas. The method has particular applications to removal of nitric oxide from gas streams produced during combustion of carbonaceous materials.

8 Claims, No Drawings

METHOD FOR THE REMOVAL OF NITRIC OXIDE FROM GAS STREAMS

BACKGROUND OF THE INVENTION

The demand for all fossil fuels combined is expected to double by the year 2000. This increased demand is expected even with the increasing use of nuclear power. While the domestic supply of crude oil and of natural gas is not likely to keep pace with the energy demand, alternative energy sources such as coal, oil shale and biomass can play an important role in filling such a gap and thus reduce the requirements for imported supplies of oil and gas.

These alternative fuel sources contain various amounts of nitrogen due to the nature of their origin. When these alternate fuels are combusted, nitrogen oxides are formed. In general, a certain amount of nitrogen oxide is generated thermally during combustion from nitrogen present in the air. However, for the most part, nitrogen oxides generated during combustion are due to fixed nitrogen present in the fuel source. Unfortunately, many of these alternative fuel sources contain relatively high amounts of fixed nitrogen and therefore pose severe environmental problems due to nitrogen oxides emissions during combustion.

Since environmental standards regarding the emission of nitrogen oxides during combustion are expected to become increasingly more stringent, there is a need for an economical method for ensuring that emissions of nitrogen oxides are maintained at acceptable levels during combustion of any fuel and particularly during combustion of high fixed nitrogen alternative fuels.

In general, during combustion of fossil fuels, nitric oxide and nitrogen dioxide are the only two oxides of nitrogen produced in significant quantities. Attempts at removing nitric oxide from gas streams utilizing iron oxides as a catalyst has shown some promise. For example, Moriguchi in his U.S. Pat. No. 4,025,604 discloses the use of iron oxide to catalyze the reduction of nitric oxide by ammonia. However, this process requires the use of large quantities of ammonia and must be carried out at relatively high temperatures. Iron oxide has also been used by Meguerian as disclosed in U.S. Pat. No. 4,104,360, in which iron oxide is used to catalyze the reduction of nitric oxide by carbon monoxide and hydrogen. The necessary presence of carbon monoxide and hydrogen or ammonia is many times undesirable.

Iron pyrite (i.e. $FeS_2$) has also been used to reduce nitric oxide emissions. For example, Gertsen in U.S. Pat. No. 3,695,828 utilizes iron pyrite and water to remove nitrogen oxides from gas streams. In this process the iron pyrite reacts with the nitric oxide to form, inter alia, nitrogen and sulfuric acid. This process is undesirable because of the production of sulfuric acid which is inherently produced because of the sulfur present in the pyrite.

It is therefore apparent that there is a present need for a method of removing nitric oxide from a gas stream where the nitric oxide removing material is inexpensive, readily available and does not produce unwanted by-products.

SUMMARY OF THE INVENTION

In accordance with the present invention nitric oxide is removed from moist gas streams in an efficient manner utilizing an inexpensive and readily available material and without production of undesirable by-products.

The present invention is based upon the surprising discovery that nitric oxide will react with elemental (metallic) iron to form elemental nitrogen. This reaction only requires water, in addition to elemental iron, to substantially reduce the amount of nitric oxide from a gas containing same. The reaction is believed to be $$Fe + H_2O + NO \rightarrow \tfrac{1}{2}N_2 + Fe(OH)_2$$

As is apparent from the reaction, the amount of moisture present in the nitric oxide containing gas should be at least equal to the amount of nitric oxide present. Preferably, the volume or moles of water present should be in stoichiometric excess of the volume or moles of nitric oxide present in the gas. The amount of excess moisture in the gas is not believed to be particularly important and the mole or, for all practical purposes, the volume ratio of nitric oxide to water may range from as high as 1:1 to as low as 1:100,000 when the gas contains relatively little nitric oxide. However, it may be said that with the vast majority of nitric oxide containing gases, the amount of moisture present will range from 1 volume percent to 10 or 15 volume percent.

An advantage of the present invention is that it utilizes elemental iron, which is produced by the hundreds of millions of tons yearly, as for example pig iron, to reduce nitric oxide emissions. A convenient metallic iron body or mass for use in the present invention can be formed by a column of iron filings.

Other features and attendant advantages of the present invention will become apparent as the invention becomes better understood by reference to the following detailed description of the invention.

DETAILED DESCRIPTION OF THE INVENTION

The present invention may be applied to any number of nitric oxide containing gas streams. However, it is particularly contemplated that the present invention will be used to substantially reduce or even eliminate nitric oxide from gas streams resulting from combustion of various fuels such as coal, coke, shale oil, spent shale or any of the various carbonaceous materials. All of these fuels produce a combustion gas stream containing varying amounts of nitric oxide.

As pointed out hereinbefore, in the method of the present invention iron reacts with nitric oxide and water. It is therefore desirable that the iron have a high surface area by providing a suitable mass or body of iron. The particular physical configuration of the elemental iron is not critical. For example, iron beads, powder, or filings may be used. If iron beads are used they will, in general, have a diameter less than about one inch or ½ inch. If iron filings are used, they will, in general, be about one to two inches long, about ¼ to ½ inches wide and have a thickness of ⅛ inch or less. In addition, iron in many other configurations such as sponge or gauze-like structures or honeycombs may be provided. Also, iron coated on suitably shaped substrates may be used. Although the particular physical configuration of the iron is not critical, it is desirable to provide an iron mass or body having a high surface area to maximize nitric oxide-iron-water contact and interaction.

Optimally, an iron mass or body of pure elemental iron is the preferred composition for use in the present invention. Other high elemental iron materials such as steel, steel alloys and the like may also be used. Any contaminants which dilute the elemental iron content of the iron body or coatings and thereby prevent the iron-nitric oxide-water reaction may lower the nitric oxide removal capacity of the iron body.

For example, a coating of rust (iron oxide) on iron filings reduces nitric oxide removal from gas streams drastically. Table 1 shows the results of tests conducted using iron filings coated with rust to remove nitric oxide from a nitrogen gas stream containing 270 ppm nitric oxide and approximately 3.5 vol. % water. The gas stream was passed through a 60 cm×2.5 cm column of the rust coated iron filings, the size of the filings ranging from a maximum of about $\frac{1}{4}''\times\frac{1}{8}''$ to a minimum of about 40 mesh.

TABLE 1

| Temp, °C. | Gas Flow Rate ml/min | Length of Run, Min. | % NO Removal |
|---|---|---|---|
| 75 | 100 | Approx. 5 | 0 |
| 75 | 40 | Approx. 5 | 18 |
| 75 | 20 | Approx. 5 | 27 |

As can be seen from Table 1, at a flow rate of 100 ml/min, 0 percent nitric oxide was removed. Removal of the rust coating resulted in subsequent nitric oxide removal under the same test conditions of 82 percent (see Table 2).

Water is a necessary reactant for carrying out the method of the present invention. Tests performed by passing a dry nitric oxide containing gas stream through an iron filing bed showed no nitric oxide removal. Tables 2 and 3 show the results of tests performed with moisture being present in the gas stream.

TABLE 2

| Temp, °C. | Gas Flow Rate ml/min | Length of Run, Min. | % NO Removal |
|---|---|---|---|
| 25 | 20 | Approx. 5 | 76 |
|  | 40 | Approx. 5 | 69 |
|  | 100 | Approx. 5 | 73 |
|  | 200 | Approx. 5 | 76 |
|  | 500 | Approx. 5 | 73 |
|  | 1,000 | Approx. 5 | 59 |
| 75 | 100 | Approx. 5 | 82 |
|  | 500 | Approx. 5 | 82 |
|  | 1,000 | Approx. 5 | 24 |
| 120 | 100 | Approx. 5 | 67 |
|  | 500 | Approx. 5 | 35 |
|  | 1,000 | Approx. 5 | 19 |

TABLE 3

| Temp. °C. | Gas Flow Rate ml/min | Length of Run, Min. | % NO Removal |
|---|---|---|---|
| 25 | 100 | 9 | 42 |
|  | 100 | 26 | 48 |
|  | 100 | 40 | 65 |
|  | 100 | 60 | 99+ |
|  | 100 | 120 | 99+ |
|  | 100 | 180 | 99+ |
|  | 100 | 240 | 99+ |
|  | 100 | 300 | 99+ |

The tests listed in Tables 2 and 3 were conducted using a nitrogen gas stream containing 270 ppm nitric oxide and 3.5 vol. percent water. The gas stream was passed through a 60 cm×2.5 cm column of iron filings in the tests shown in Table 2 and through a 43 cm×0.8 cm column in the tests shown in Table 3. The filings in both columns were about the same size as those used in the Table I tests.

In the test listed in Table 3, a nitrogen gas stream containing 270 ppm nitric oxide and 3.5 vol. percent water was passed through the column which contained 75 grams of metallic iron filings. The test was conducted at ambient temperatures. After 34 liters of gas at a rate of 100 milliliters per minute had been passed through the column, breakthrough of nitric oxide had still not occurred. This gas stream was monitored for nitric oxide and nitrous oxide by gas chromatography-microcoulometry. After 60 minutes, the treated gas did not show any detectable nitric oxide or nitrous oxide, indicating at least 99+% removal. The lower nitric oxide removal indicated during the first 40 minutes of moist gas flow is believed to be due to the iron filings not having reached equilibrium moisture. The absence of nitrous oxide in the resulting gas stream indicates that the nitric oxide is being reduced to nitrogen rather than being reduced to nitrous oxide.

Preferably a stoichiometric excess of water is present in the gas stream. As discussed in the Summary of the Invention, the water is believed to react in equimolar amounts with nitric oxide in the gas stream. This would require at least 270 ppm water in the gas streams tested to provide sufficient water for complete nitric oxide removal. Although the amount of excess water in the gas streams is not particularly critical, high moisture levels should be avoided to reduce rust formation on the metallic iron bodies. Water to nitric oxide volume ratios of 100:1 to 200:1 are preferred. If water must be added to a gas stream to maintain the desired moisture level, it may be added in any convenient manner prior to contact with the metallic iron.

The temperature at which the metallic iron reacts with the nitric oxide and water is not particularly critical; however, it is preferably carried out at relatively low tempertures (between 0° C. and 200° C.). As shown in Table2, at a temperature of 120° C., there is a drop in nitric oxide removal compared to lower temperature tests. As a result, it may be desirable to cool hot nitric oxide containing gas streams to temperatures below 200° C. prior to contact with the metallic iron mass or body. According to Table 2, maximum NO reduction occurs when the temperature is maintained near 75° C.

No particular gas stream composition is preferred; however, the gas stream should be relatively free of contaminants which coat or react with the metallic iron.

The method of the present invention can be applied to gas streams containing widely varying amounts of nitric oxide. By increasing the size of the iron filing column or reducing the flowrate, large amounts of nitric oxide may be removed.

The gas stream may be contacted with the iron body or mass in any way. The gas stream may be passed through a fluidized bed of iron bodies, fixed bed or packed column.

The contact time or flow rate of the nitric oxide containing gaseous stream over or through the metallic iron body or mass is not particularly critical. However, as shown in Table 2, as the flow rate of the gas stream increases, the percent nitric oxide removal decreases. It is preferable that the flow rate be controlled at a level to reduce the nitric oxide by at least about 40 or 50 volume percent. Desirable flow rates will vary widely and can easily be established according to the amount of iron in the column and nitric oxide and moisture in the gas.

The gas stream pressure is also not critical and can be varied according to back pressure due to passage through different elemental iron masses and varied to achieve desired flow rates.

As can be seen by the above examples and description, the present invention provides an efficient, inexpensive and simple method for reducing nitric oxide to nitrogen and thereby removing it from gas streams. Having thus described the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein.

What is claimed is:

1. A method for reducing the amount of nitric oxide in a gas containing same which comprises:
    introducing a gas containing nitric oxide and water, the volume of water in said gas being at least equal to the volume of nitric oxide to be removed, into contact with elemental iron at a temperature below 200° C. for a sufficient length of time to react a significant portion of said nitric oxide with said water and elemental iron to thereby reduce the amount of nitric oxide in said gas.

2. A method according to claim 1 wherein said elemental iron is a high surface area mass.

3. A method according to claim 2 wherein said high surface area mass is composed of iron filings.

4. A method according to claim 1 wherein the volume of water in said gas is between 1 and 15 volume percent.

5. A method according to claim 4 wherein said volume of water in said gas is between 2 and 4 volume percent.

6. A method according to claim 1 wherein said temperature is between 0° and 200° C.

7. A method according to claim 6 wherein said temperature is near 75° C.

8. A method according to claim 1 wherein at least 40 volume percent of said nitric oxide is removed from said gas.

* * * * *